United States Patent [19]

Kitazawa

[11] Patent Number: 5,150,140
[45] Date of Patent: Sep. 22, 1992

[54] MOTOR DRIVEN CAMERA HAVING STROBE INCORPORATED THEREIN

[75] Inventor: Toshiyuki Kitazawa, Tokyo, Japan

[73] Assignee: Asahi Kogaku Kogyo Kabushiki Kaisha, Tokyo, Japan

[21] Appl. No.: 552,108

[22] Filed: Jul. 16, 1990

[30] Foreign Application Priority Data

Jul. 21, 1989 [JP] Japan .................. 1-190169
Jul. 21, 1989 [JP] Japan .................. 1-190170

[51] Int. Cl.⁵ ............................................. G03B 17/02
[52] U.S. Cl. ........................... 354/145.1; 354/149.11; 354/288
[58] Field of Search ............... 354/82, 145.1, 152, 354/173.1, 212, 214, 288, 149.11

[56] References Cited

U.S. PATENT DOCUMENTS

| | | | |
|---|---|---|---|
| 4,351,599 | 9/1982 | Suzuki et al. ........................ | 354/288 |
| 4,544,251 | 10/1985 | Haraguchi et al. ................. | 354/288 |
| 4,557,574 | 10/1985 | Kohno et al. ...................... | 354/149.11 |
| 4,579,435 | 4/1986 | Haraguchi ........................ | 354/173.1 |
| 4,739,359 | 4/1988 | Fukahori et al. .................. | 354/214 X |
| 4,771,303 | 9/1988 | Matsumoto et al. ............... | 354/288 X |

OTHER PUBLICATIONS

Fotomagazin, Knips-Maschinen fur Aufsteiger, pp. 50-54, Mar. 1987.

Primary Examiner—L. T. Hix
Assistant Examiner—D. Rutledge
Attorney, Agent, or Firm—Sandler, Greenblum & Bernstein

[57] ABSTRACT

A strobe incorporated in a camera having two drive motors, a main strobe condenser and a battery. The first drive motor is located in a rotatable film winding spool of the camera, and the second drive motor, the main strobe condenser and the battery are located to surround the film winding spool. Thus, the longitudinal axes thereof extend in the direction of the rotational axis of the film winding spool. The centers of the two drive motors, the main strobe condenser and the battery, in the plan view, substantially form an imaginary quadrilateral or an imaginary triangle.

19 Claims, 4 Drawing Sheets

MOTOR DRIVEN CAMERA HAVING STROBE INCORPORATED THEREIN

BACKGROUND OF THE INVENTION

1. Field of the Invention

The present invention relates to a strobe incorporated into a camera having two motors, and more precisely, to an arrangement of components in such a camera.

2. Description of the Related Art

A recent camera has various improved functions, such as silent film winding at high speed and at high efficiency. To this end, independent motors are provided for winding and rewinding film, and for moving a mirror and a shutter, in addition to an AF motor for automatic focusing. Furthermore, in a camera having a strobe incorporated therein and a large condenser also incorporated within the camera, it is necessary to provide a large battery for driving the motors.

SUMMARY OF THE INVENTION

The primary object of the present invention is to provide a motor-driven camera having a strobe incorporated therein in which two motors, the strobe condenser, and the battery can be effectively arranged.

The inventor has found that ① the drive motors and the strobe condenser should be longitudinally arranged from a view point of effective utilization of space, since the ratio of the length of the drive motors and the battery to the radius thereof is 2~4; ② the drive motors should be longitudinally arranged, in view of a connection of gears of a reduction gear train which are usually located side by side and drive shafts of the drive motors; and, ③ the heavy components, such as the battery, drive motors and the strobe condenser should be located within a grip provided on the front left side of the camera body in the vicinity of a winding spool or a cassette chamber.

To achieve the object mentioned above, according to the present invention, there is provided a camera having a motor-driven strobe incorporated therein and including more than one drive motor. One of the drive motors is located within a film winding spool, and the other drive motor or one of the other drive motors, the strobe condenser and the battery are longitudinally arranged to have their length extending in a direction of the rotational axis of the winding spool. Thus, the lines connecting the centers of planes of the two drive motors, a main condenser, and the battery substantially forms a quadrilateral or a triangle, as viewed from above.

With this arrangement, the dead space within the grip of the camera is made smaller, and a weight balance can be improved, since the heavy components are placed in the grip, resulting in an easily held camera.

BRIEF DESCRIPTION OF THE DRAWINGS

The invention will be described below in detail with reference to the accompanying drawings, in which.

DESCRIPTION OF THE PREFERRED EMBODIMENTS

Figure 1:
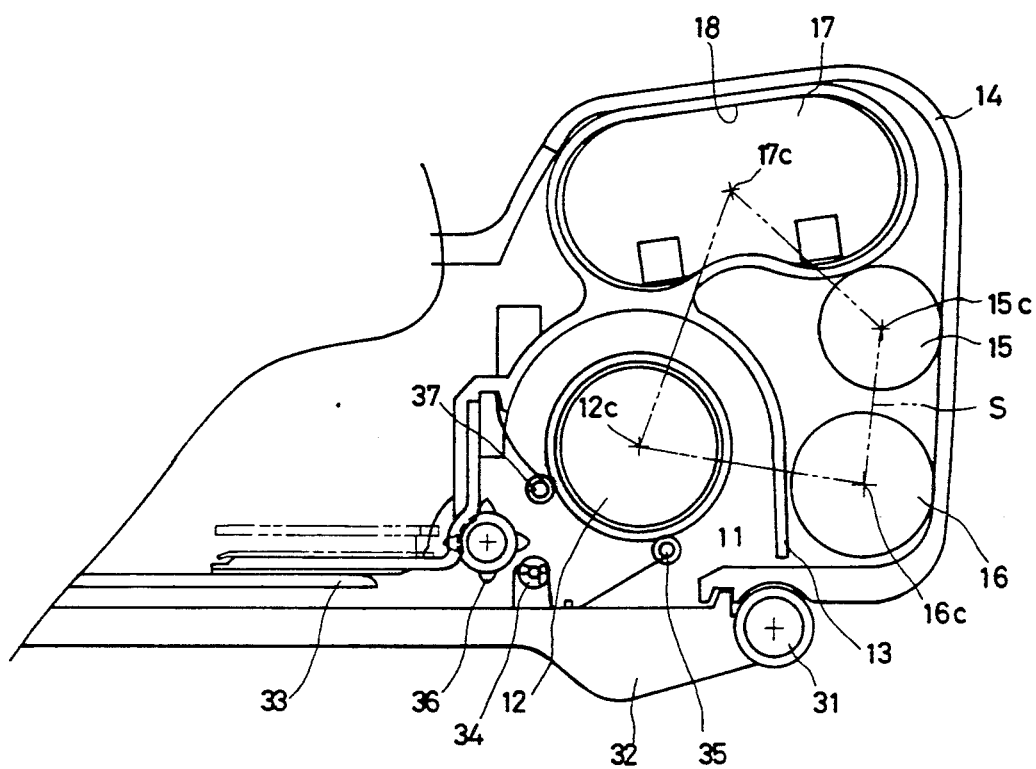
FIGS. 1 through 3 are plan views of a strobe incorporated in a camera according to a first group of embodiments of the invention.
Figure 2:
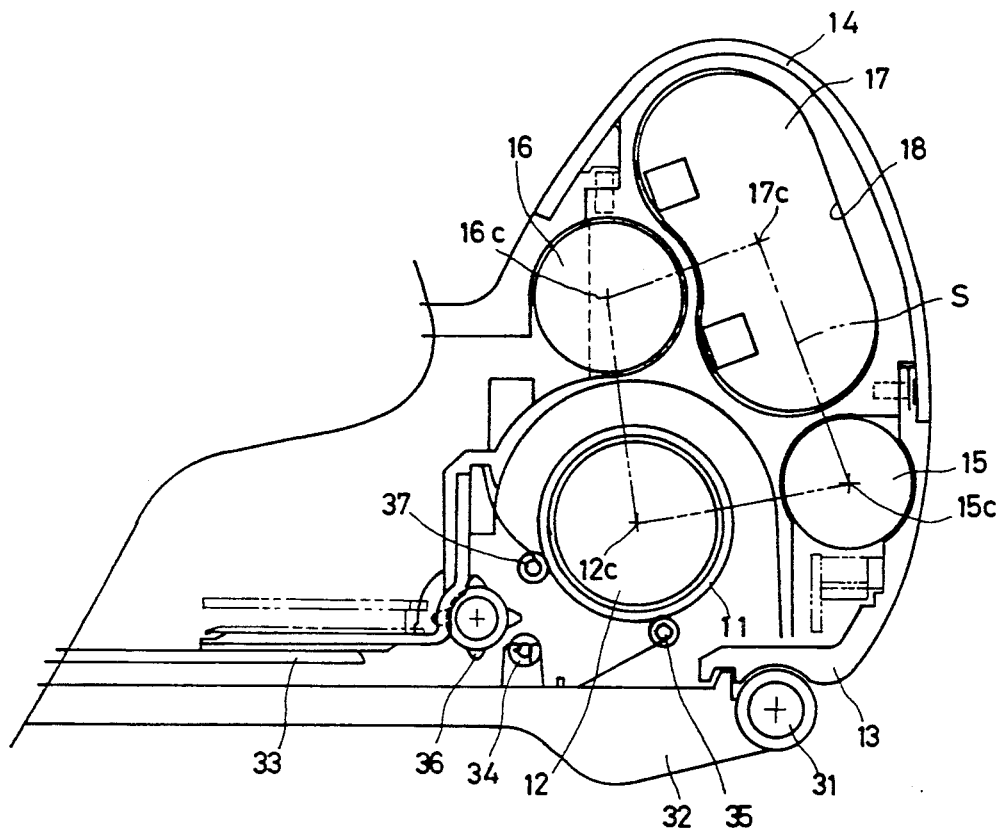
Figure 3:
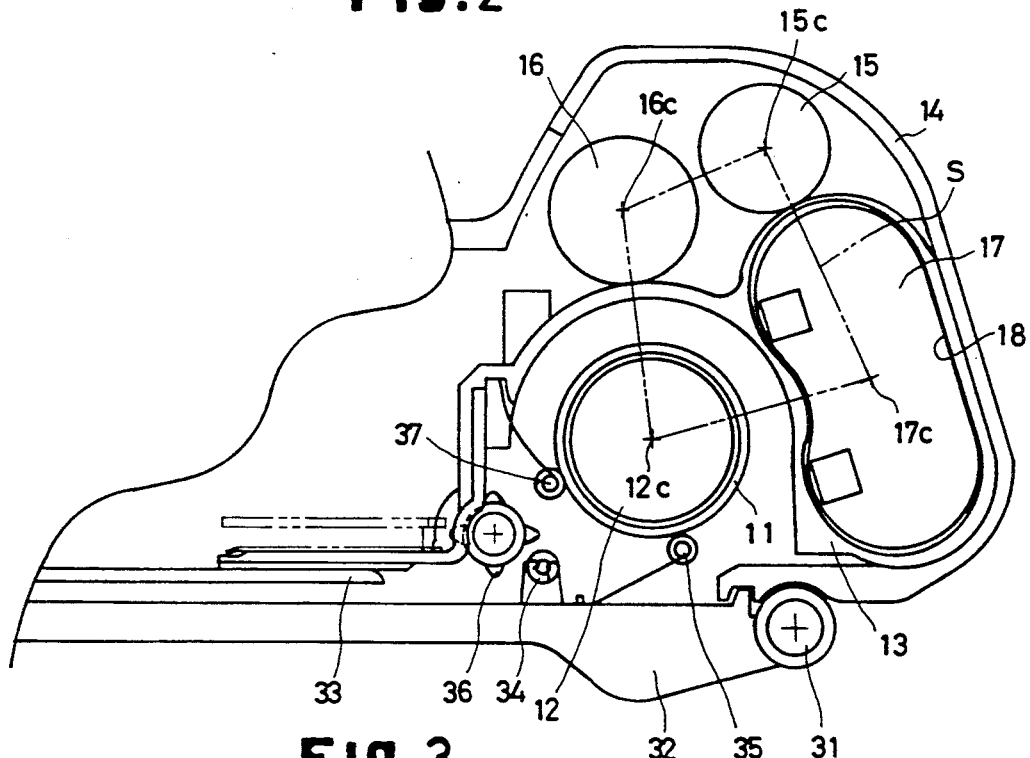
Figure 4:
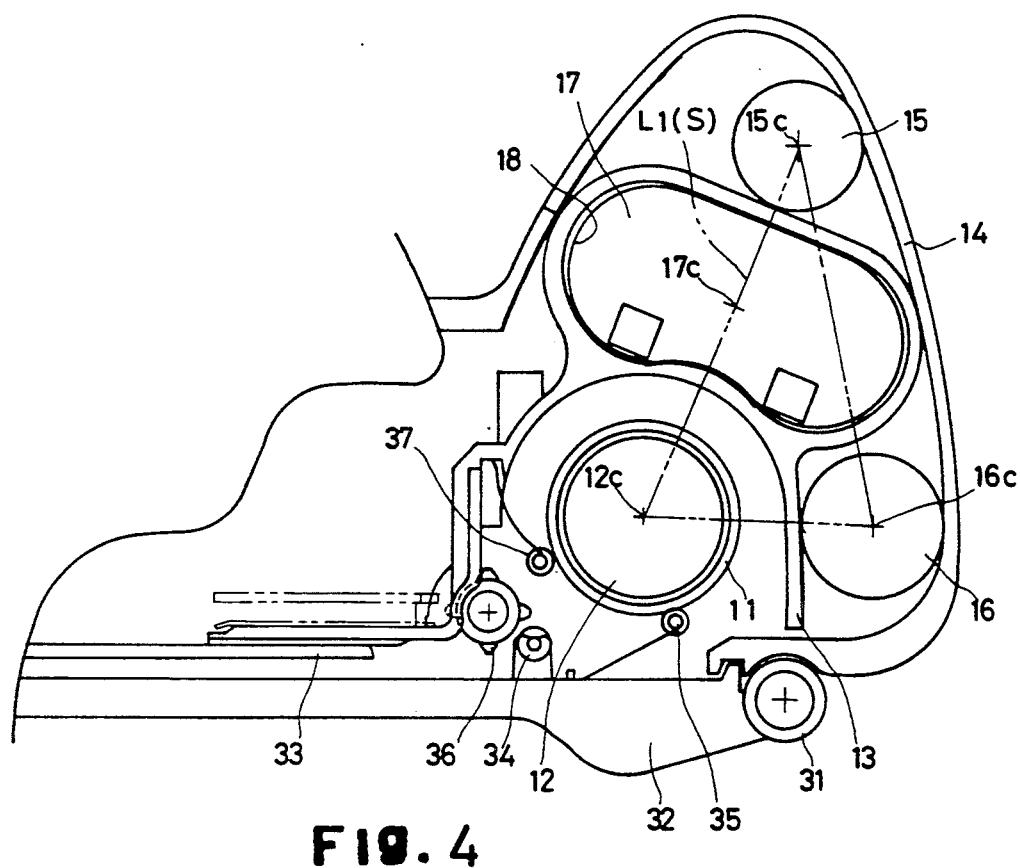
FIGS. 4 through 6 are plan views of a strobe incorporated camera according to a second group of embodiments of the invention; and, FIG. 7 is a front elevational view of an arrangement of various mechanisms of a camera according to the present invention.
Figure 5:
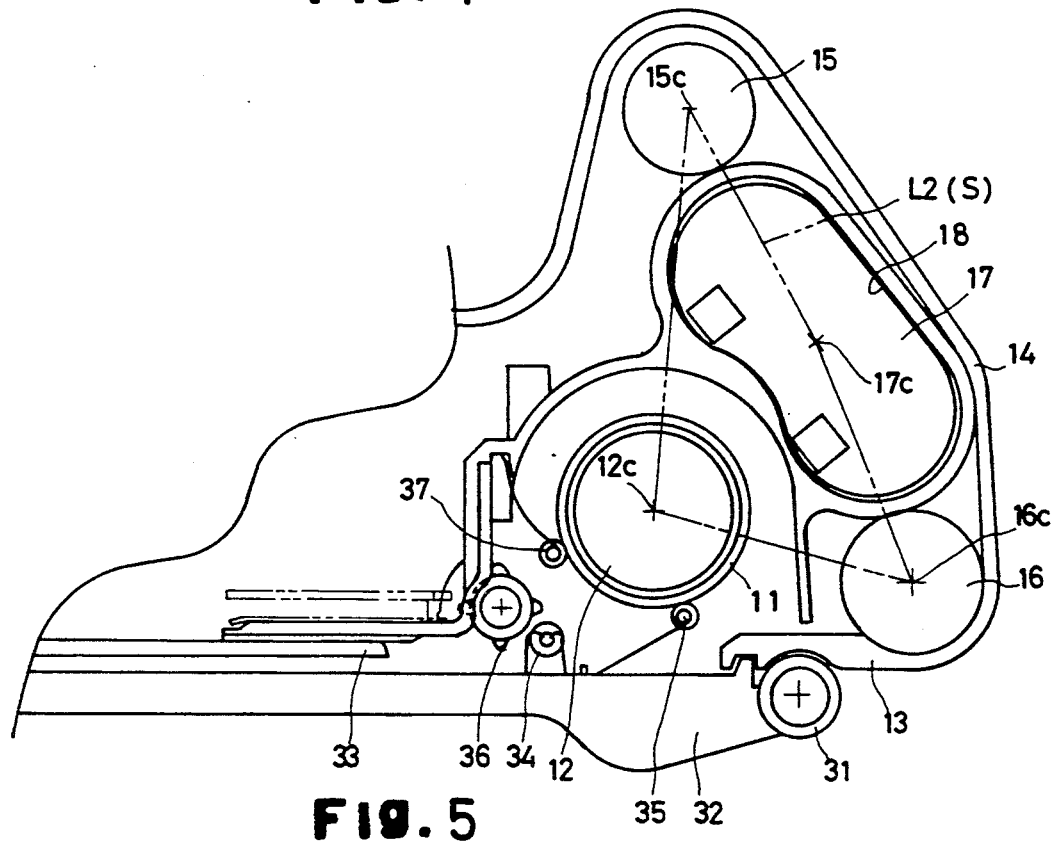
Figure 6:
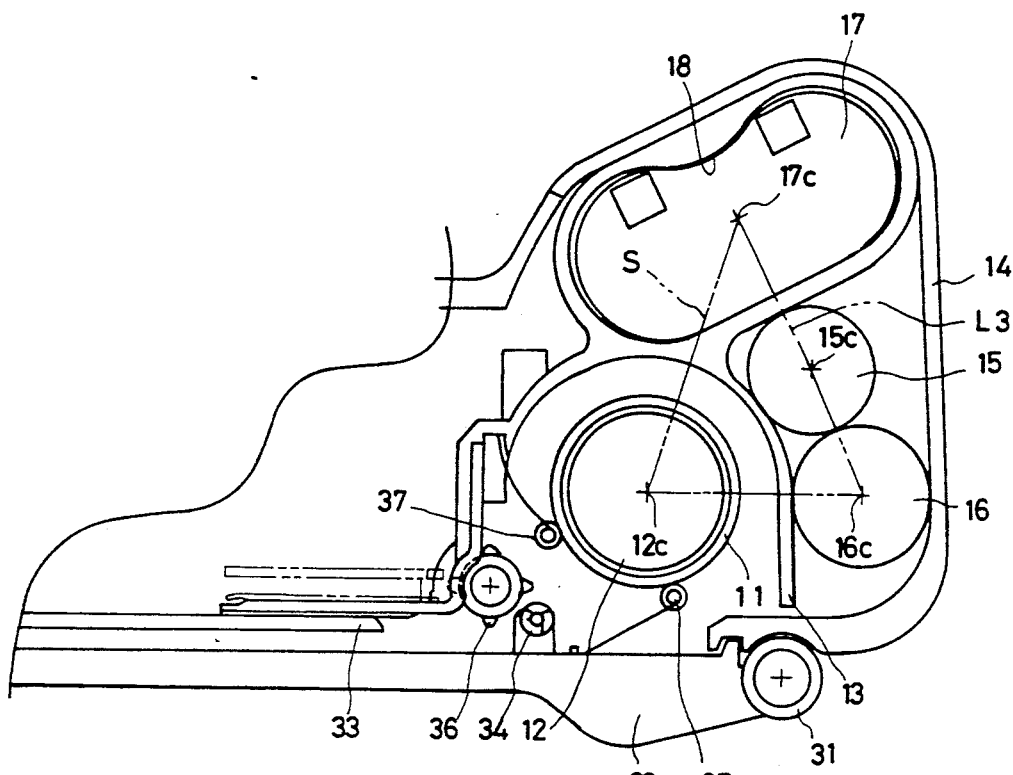

FIGS. 1 through 3 show a first group of embodiments of a motor-driven camera having a strobe incorporated therein, according to the present invention and FIGS. 4 through 6 show a second group of embodiments thereof. The main difference between the first group of embodiments and the second group of embodiments is directed to the arrangement of two drive motors, the main condenser, and the battery. Namely, the lines connecting the centers of these components substantially form a quadrilateral in the embodiments shown in FIGS. 1 through 3 and a triangle in the embodiments shown in FIGS. 4 through 6, in a plan view.

In the embodiments shown in FIGS. 1 through 3, a first drive motor 12 for charging (driving) the mirror and the shutter is vertically placed in a film winding spool 11. Namely, the longitudinal axis of the first motor 12 extends in the vertical direction in the film winding spool 11. A second drive motor 15 for winding and rewinding film, a main condenser 16 for a strobe and a battery (lithium battery) 17 are vertically located in a grip 14 of a camera body 13 to surround the first drive motor 12. The grip 14 is, as is well known, provided on the front left side of the camera body to project forwardly, so that the camera can be easily held by a photographer.

In the various embodiments, the arrangements of the second drive motor 15, the strobe main condenser 16 and the battery 17 are different from each other. However, in the first group of embodiments shown in FIGS. 1 through 3, the lines connecting the centers 12c, 15c, 16c and 17c of the first drive motor 12, the second drive motor 15, the strobe main condenser 16 and the battery 17 substantially form a quadrilateral S, as shown by imaginary lines. In the illustrated embodiments, the quadrilateral is nearly trapezoidal.

The first drive motor 12, the second drive motor 15, the strobe main condenser 16 have circular cross sectional shapes, and accordingly, the centers 12c, 15c and 16c thereof are centers of the circles. The center 17c of the battery 17 is defined to be a planer center of a battery receiving chamber 18. The same is true when a plurality of batteries are provided in the battery receiving chamber 18.

With the arrangement of the first group of embodiments, mentioned above, there is less dead space in the grip 14. Furthermore, the heavy components, such as the motors, the battery, and the main condenser, etc. are placed in the grip 14, resulting in a good weight balance and easy portability of the camera.

The following discussion will be directed to a second group of embodiments shown in FIGS. 4 through 6. In the embodiments shown in FIGS. 4 through 6, the centers 12c, 15c, 16c and 17c of the first drive motor 12, the second drive motor 15, the strobe main condenser 16 and the battery 17 substantially form a triangle in the plan view. The arrangement of the first drive motor 12, the second drive motor 15, the strobe main condenser 16 and the battery 17 are different from each other in each of the second group of embodiments. However, in the second group of embodiments shown in FIGS. 4 through 6, the centers of at least three components among the four components are substantially located on a line in the grip 14. Namely, in the embodiment shown in FIG. 4, the centers 12c, 17c and 15c of the first drive motor 12, the battery 17, and the second drive motor 15 in a plan view are substantially located on a straight line L1. The centers 17c, 15c and 16c of the battery 17, the second drive motor 15 and the strobe main condenser 16 in a plan view are substantially located on a straight line L2 in the embodiment shown in FIG. 5. In the embodiment shown in FIG. 6, the centers 17c, 15c and 16c of the battery 17, the second drive motor 15 and the strobe main condenser 16 are substantially located on a straight line L3 in a plan view.

It will be easily understood that the centers of the two end components of the three components having the centers substantially located on the straight line L1, L2 or L3 and the center of the remaining component substantially form a triangle S, as shown by imaginary lines in FIGS. 4, 5 and 6.

In the embodiments shown in FIGS. 4, 5 and 6, in addition to the technical advantages of less dead space, improved weight balance, and easy carriage of the camera, as mentioned above, there is an advantage that the camera looks like smaller than it is, since the front projection surface area of the camera is decreased.

Figure 7:
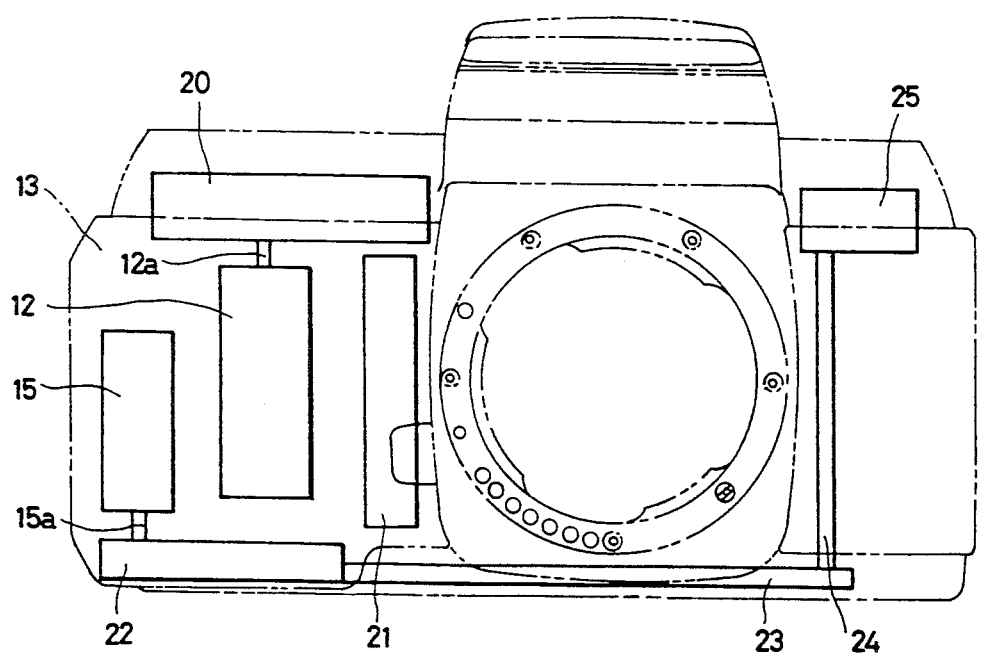

The transmission mechanism shown in FIG. 7 includes a drive system which is driven by the first drive motor 12 and the second drive motor 15. In the arrangement shown in FIG. 7, the output shaft 12a of the first drive motor 12 which extends upward in the vertical direction is connected to a mirror shutter charging mechanism 20 located above the winding spool 11, so that the rotation of the first drive motor 12 is transmitted to the mirror shutter charging mechanism 20. The rotation is then transmitted to a mirror diaphragm mechanism 21 provided on the side face of the mirror box. The output shaft 15a of the second drive motor 15 which extends downward in the vertical direction is connected to a film winding mechanism 22 provided on the lower portion of the winding spool 11 to transmit the rotation of the second drive motor thereto. The rotation is then transmitted to a film rewinding mechanism 25 through a rewinding gear train 23 and a through shaft 24. In the arrangement shown in FIG. 7, since the first drive motor 12 is located in the winding spool 11, the gear train can be effectively constituted. Alternatively, it is also possible to locate the second drive motor 15 and the first drive motor 12 in the winding spool 11 and on the side of the winding spool. The output shafts 12a and 15a of the first and second drive motors 12 and 15 extend perpendicular to the optical axis of the camera without intersecting the same. This makes it possible to effectively arrange the reduction gear mechanism for the mirror shutter charging mechanism 20 and the film winding mechanism 22.

The following explanation will be directed to the other components shown in FIGS. 1 through 6.

A back cover 32, which is pivotally attached to the camera body 13 through a shaft 31, is provided with a pressure plate 33 and film rollers 34 and 35. The camera body 13 has a sprocket 36 and a film roller 37 provided thereon, so that the film is guided by the pressure plate 33 and the film rollers 34, 35 and 37 and is fed by the sprocket 36 to be wound onto the winding spool 11.

In the motor-driven camera having an incorporated strobe, as constructed above, according to the present invention, the second drive motor, the strobe condenser, and the battery are arranged to surround the first drive motor which is provided in the film winding spool so as to have the longitudinal axes extending in the vertical direction, so that the centers of the drive motors, the main condenser and the battery in a plan view form an imaginary quadrilateral or an imaginary triangle in the grip of the camera, thus resulting in less dead space, a good weight balance and an improved portability of the camera.

I claim:

1. A strobe incorporated in a camera having at least first and second drive motors, a main strobe condenser and at least one battery, wherein:

said first drive motor is located in a rotatable film winding spool of the camera;

said second drive motor, said main strobe condenser and said battery are located to surround said film winding spool, so that the longitudinal axes of said second drive motor, said main strobe condenser and said battery extend in the direction of the rotational axis of said film winding spool; and the centers of said two drive motors, said main strobe condenser and said battery in a plan view substantially form an imaginary polygon.

2. A strobe incorporated in a camera according to claim 1, wherein the imaginary polygon is substantially trapezoidal.

3. A strobe incorporated in a camera according to claim 2, wherein one of said drive motors, said battery and said main condenser are substantially located on a straight line.

4. A strobe incorporated in a camera according to claim 3, wherein said one of the drive motors is said first drive motor.

5. A strobe incorporated in a camera according to claim 3, wherein said battery is located between said first drive motor and said second drive motor.

6. A strobe incorporated in a camera according to claim 3, wherein said battery is located between said second drive motor and said main strobe condenser.

7. A strobe incorporated in a camera according to claim 1, wherein said first and second drive motors are located at two apexes of the imaginary polygon.

8. A strobe incorporated camera according to claim 1, wherein said first drive motor in said winding spool is a mirror and shutter charging motor.

9. A strobe incorporated in a camera according to claim 8, wherein said second drive motor is a driving motor for a film winding and rewinding mechanism.

10. A strobe incorporated in a camera according to claim 1, wherein said drive motors have output shafts that extend in directions parallel to each other without intersecting an optical axis of the camera.

11. A strobe incorporated in a camera according to claim 1, further comprising a grip which is provided on the front left side of a camera body, so that said drive motors, said main condenser and said battery are located in said grip.

12. A strobe incorporated in a camera having two drive motors, a main strobe condenser and a battery, wherein said drive motors, said main strobe condenser and said battery are located, so that the longitudinal axes thereof extend in the vertical direction of the camera.

13. A strobe incorporated in a camera according to claim 12, wherein centers of said two drive motors, said main strobe condenser and said battery, in a plan view, substantially form an imaginary quadrilateral.

14. A strobe incorporated in a camera according to claim 12, wherein centers of said two drive motors, said main strobe condenser and said battery, in a plan view, substantially form an imaginary triangle.

15. A strobe incorporated in a camera according to claim 12, further comprising a grip which is provided on the front side of a camera body, so that said drive motors, said main condenser and said battery are located in said grip.

16. A strobe incorporated in a camera according to claim 15, wherein one of the drive motors is located in a film winding spool of said camera body.

17. The strobe incorporated in a camera according to claim 1, wherein said second drive motor, said main strobe condenser, and said battery are positioned adjacent to the periphery of said film winding spool.

18. The strobe incorporated in a camera according to claim 1, wherein said imaginary polygon is positioned on one side of a camera lens.

19. The strobe incorporated in a camera according to claim 12, wherein said two drive motors, said main strobe condenser and said battery are located to one side of a camera lens.

* * * * *

UNITED STATES PATENT AND TRADEMARK OFFICE
CERTIFICATE OF CORRECTION

PATENT NO. : 5,150,140
DATED : September 22, 1992
INVENTOR(S) : T. KITAZAWA

It is certified that error appears in the above-indentified patent and that said Letters Patent is hereby corrected as shown below:

At column 4, line 47 (claim 10, line 3), insert ---substantially--- after "directions".

Signed and Sealed this

Twenty-second Day of August, 1995

Attest:

BRUCE LEHMAN

Attesting Officer

Commissioner of Patents and Trademarks